C. FRIEDERICH.
RESILIENT TIRE.
APPLICATION FILED SEPT. 19, 1911.
1,021,591.
Patented Mar. 26, 1912.
2 SHEETS—SHEET 1.
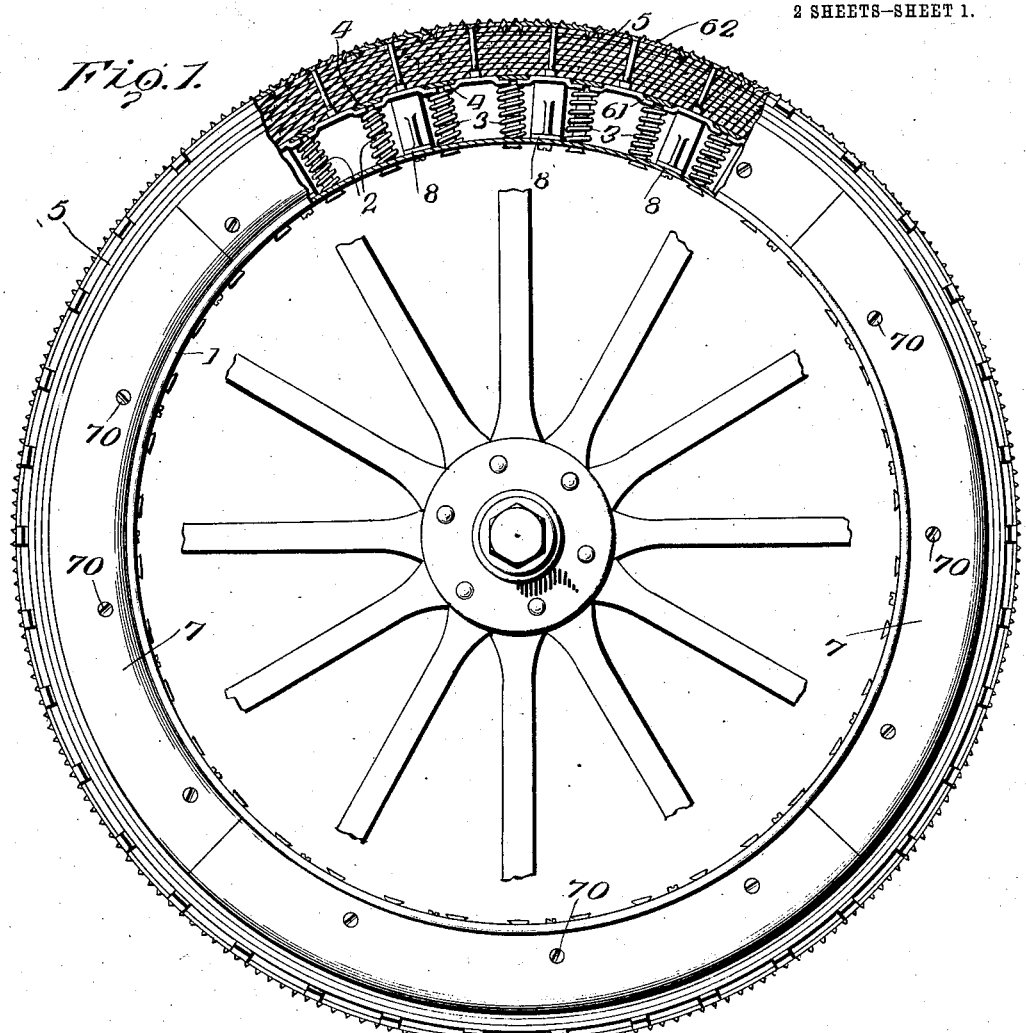
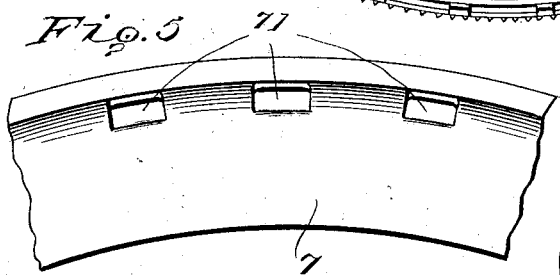
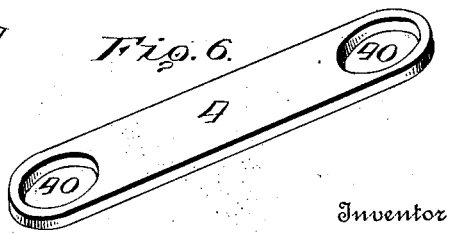

C. FRIEDERICH.
RESILIENT TIRE.
APPLICATION FILED SEPT. 19, 1911.
1,021,591.
Patented Mar. 26, 1912.
2 SHEETS—SHEET 2.
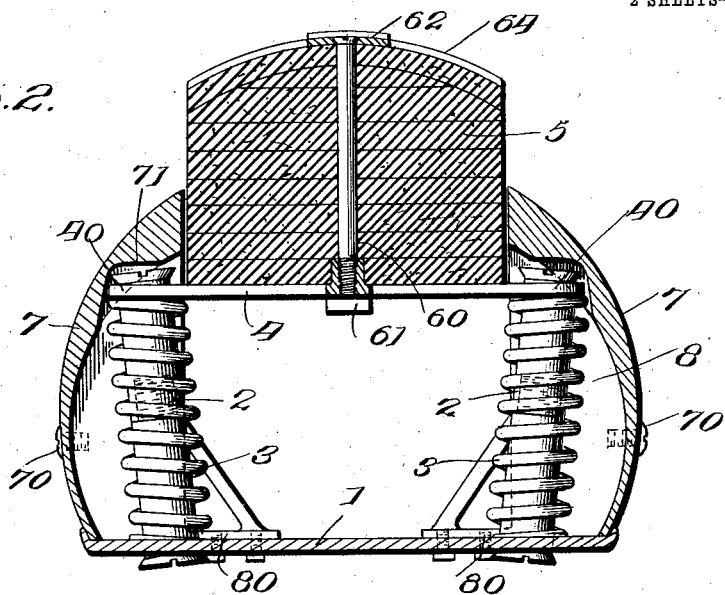
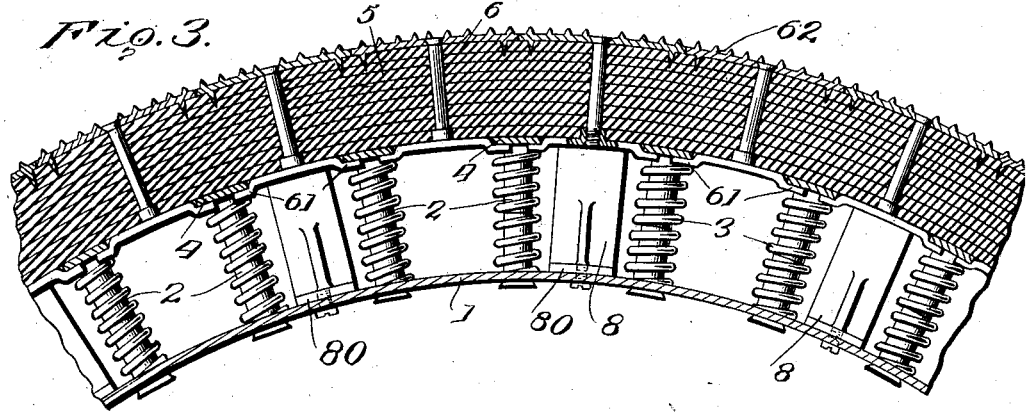
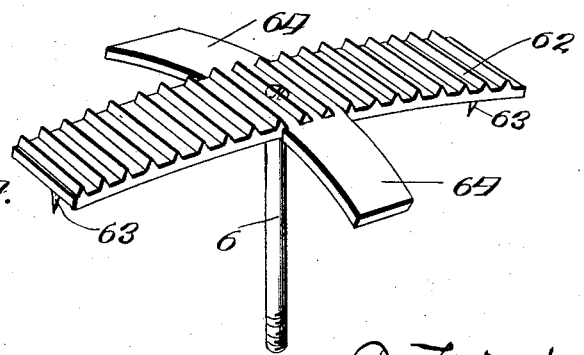
Witnesses
E. R. Peck
L. L. Burket
Inventor
C. Friederich
By Herbert E. Peck
Attorney

UNITED STATES PATENT OFFICE.

CHRISTIAN FRIEDERICH, OF TRIPP, SOUTH DAKOTA.

RESILIENT TIRE.

1,021,591. Specification of Letters Patent. Patented Mar. 26, 1912.

Application filed September 19, 1911. Serial No. 650,115.

*To all whom it may concern:*

Be it known that I, CHRISTIAN FRIEDE-RICH, a citizen of the United States, residing at Tripp, county of Hutchinson, South Dakota, have invented certain new and useful Improvements in Resilient Tires; and I do hereby declare the following to be a full, clear, and exact description of the invention, such as will enable others skilled in the art to which it appertains to make and use the same.

This invention relates to certain improvements in resilient tires for vehicles; and the objects and nature of the invention will be readily understood by those skilled in the art in the light of the following explanation of the accompanying drawings illustrating what I now consider to be my preferred embodiment from among other forms and arrangements within the spirit and scope of my invention.

The invention consists in certain novel features in construction and in combinations and arrangements of parts as more fully and particularly set forth and specified hereinafter.

Referring to the accompanying drawings, forming a part hereof:—Figure 1, is a side elevation of a tire embodying my invention, a portion thereof being shown in section. Fig. 2, is a cross sectional view thereof. Fig. 3, is a longitudinal section of a portion of the tire. Fig. 4, is a detail perspective of tread plates and a securing bolt therefor. Fig. 5, is an elevation of a side plate showing the inner face thereof, and sockets or recesses therein to receive the posts carrying the springs Fig. 6, is a detail perspective of one of the cross heads.

In constructing the tire of my invention, I employ a strong comparatively heavy metal, or other suitable, rim 1, adapted to be fixed in any suitable manner to the spokes of the wheel to which the tire is applied. Around this rim and projecting outwardly and about radially therefrom, I provide two series of fixed or rigid posts 2, the two series being spaced apart and arranged, respectively, near the outer longitudinal edge portions of the rim 1. The posts of each series are uniformly spaced apart and are arranged opposite the corresponding posts of the other series. The posts are fixed to the rim 1, and usually extend through perforations in said rim, and are headed at their opposite ends. If so desired, each post can be composed of two sections, each having a head at one end and screw-threaded at its opposite end, one section being hollow at its threaded end to receive the externally threaded end of the other section so that the two sections screw together one within the other to form the completed post.

Strong coiled expansion springs 3, are arranged on the posts with their inner ends resting on the rim 1, and their outer ends abutting the inner faces of cross heads 4, vertically or radially movable or slidable on the posts against the compression of the springs, and carrying the tread 5. Each cross head extends transversely across the tire and is formed with end eyes 40, loosely receiving two opposite posts to slide vertically thereon against the compression of the springs on said posts, said springs constantly tending to hold the cross head outwardly to its limit of outward movement to or approximately to the outer end heads of the posts. These cross heads support, are confined to and extend transversely across the inner face of the flexible tread 5, which is in the form of a comparatively thick ring or annulus and is preferably composed of layers of leather suitably secured together and formed to render the tread flexible.

In the example illustrated, the leather layers forming the tread are secured together by vertically disposed bolts or screws 6, extending inwardly therethrough and at their projecting inner ends screwing into or otherwise coupled to elongated nuts or plates 60, arranged longitudinally of and against the inner face of the tread and at their ends 61, offset downwardly to abut against the edges of and fit under adjacent cross heads 4, and thereby hold the same to the tread and to prevent the tread creeping on the cross heads.

The posts and tread are braced against side or lateral thrust and the springs are protected by suitable side plates 7, and metal blocks 8, the arrangement being such that the tread is movable radially between the opposite sets of side plates and blocks. The blocks 8, are arranged along the opposite edge portions of the rim and project outwardy therefrom between the posts. I usually arrange the blocks between certain posts, uniformly distributing the same around the rim. Each block is formed with a base 80, bolted or otherwise secured on the outer face of the rim. The length of the block vertically is approximately equal to the length of the posts while the outer face of the block extends laterally and outwardly beyond the circle of the posts. The inner vertical edges of the blocks are usually straight to guide and brace the tread in its vertical movement.

The side plates 7, form opposite side walls closing the space between the rim and the tread so as to inclose the springs, posts and blocks in such space and between such opposite walls. These plates fit the outer edges of the blocks and conform thereto and are suitably secured and fixed to the blocks, as by screws 70. At their inner edges, the side plates fit and engage the edge portions of the rims beyond the inner ends of the blocks and posts, while the outer edges of the plates extend outwardly beyond the outer ends of the posts and blocks and extend inwardly over the same to engage the side faces of the tread. The opposite side faces of the tread are preferably flat and parallel and lie between the flat parallel inner edge faces of the outwardly projecting portions of the opposite side plates. The inner faces of the outwardly projecting portions of the side plates are preferably formed with sockets 71, receiving the outer end portions of the posts and thereby bracing the posts and maintaining the same properly spaced.

Those skilled in the art will readily understand the operation of the device and that springs are employed of sufficient strength to carry the normal load desired, and that in use, the portion of the tread in engagement with the road will bend or flex upwardly driving the cross heads thereabove inwardly on the posts against the compression of the springs, the springs restoring the tread to normal position as the wheel revolves. I preferably arrange corrugated, toothed or otherwise surfaced metal tread plates 62, centrally and longitudinally of the crown of the tread 5, and secure the same by the bolts 6, and if so desired, by spurs 63. Such plates can also carry cross plates 64, arranged transversely and exteriorly of the tread. These plates serve as anti-skid devices and protect the leather tread, and also constitute means whereby the bolts 6, and leather strips of the tread are more rigidly held together.

It is evident that various changes and modifications might be resorted to without departing from the spirit and scope of my invention and hence I do not wish to limit myself to the exact disclosures hereof but consider myself entitled to all such variations as fall within the spirit and scope of the following claims.

What I claim is:—

1. A resilient tire comprising a rim, two spaced series of spring posts, said posts being spaced apart and projecting approximately radially from said rim, coiled tread-sustaining springs on said posts, a flexible tread arranged between said series of posts and provided with cross heads having projecting ends bearing on said springs and receiving and slidable on said posts, and fixed opposite side plates inclosing the springs and posts, said tread being arranged between the other edge portions of said side plates.

2. A resilient tire comprising a rim, a flexible tread having flat opposite side faces, two series of blocks at their inner ends fixed to the rim, the blocks being spaced apart and projecting radially from the rim beyond the opposite side faces of the tread so that the tread is movable radially between said series, opposite side plates fitting the outer faces of said blocks and rigidly secured thereto and inclosing the space between the rim and tread, the outer edge portions of the plates extending inwardly toward the opposite side faces of the tread and over beyond the outer ends of said blocks, coiled tread-sustaining springs, and means carried by the tread and seating against the outer ends of said springs, said springs being arranged in two series, said tread being movable inwardly between said series of springs and against the compression thereof.

3. A resilient tire comprising a rim, approximately radially arranged fixed spring posts projecting therefrom, said posts being spaced apart and arranged in two series along the opposite edge portions of the rim, coiled tread sustaining springs on said posts, opposite fixed side plates at their outer edge portions extending inwardly beyond the outer ends of the posts and at their inner portions having recesses receiving the outer ends of the posts, respectively, and a flexible tread arranged between the outer edge portions of said plates and between the series of posts and provided with means seated against the outer ends of said springs and movable on said posts.

4. A resilient tire comprising a rim portion, a flexible tread portion, cross heads arranged transversely of the inner face of the tread portion and projecting laterally beyond the same, bolts passed inwardly through the tread portion, plates on the inner ends of said bolts and arranged longitudinally of the inner face of the tread portion and holding the tread portion against creeping on said heads, and coiled springs between the rim and tread portions and seating against said heads.

In testimony whereof I affix my signature, in presence of two witnesses.

CHRISTIAN FRIEDERICH.

Witnesses:
J. M. SCHAEFER,
K. O. FRIEDERICH.

Copies of this patent may be obtained for five cents each, by addressing the "Commissioner of Patents, Washington, D. C."